US007881031B2

(12) United States Patent
Neumann et al.

(10) Patent No.: US 7,881,031 B2
(45) Date of Patent: Feb. 1, 2011

(54) OVERCURRENT PROTECTION CIRCUIT WHEN SETTING CURRENT USING A PACKAGE CONTROL PIN

(75) Inventors: Bernd Neumann, Müllrose (DE); Maik Pohland, Frankfurt (DE); Dieter Kühnel, Frankfurt (DE)

(73) Assignee: Micrel, Inc., San Jose, CA (US)

( * ) Notice: Subject to any disclaimer, the term of this patent is extended or adjusted under 35 U.S.C. 154(b) by 542 days.

(21) Appl. No.: 11/952,868

(22) Filed: Dec. 7, 2007

(65) Prior Publication Data

US 2009/0147425 A1 Jun. 11, 2009

(51) Int. Cl.
*H02H 9/08* (2006.01)

(52) U.S. Cl. ..................................... 361/93.9; 361/93.1

(58) Field of Classification Search ........ 361/93.1–93.9
See application file for complete search history.

(56) References Cited

U.S. PATENT DOCUMENTS 7,183,755 B2 * 2/2007 Itoh et al. .................. 323/274
7,268,523 B2 * 9/2007 Itoh ........................... 323/276

* cited by examiner

*Primary Examiner*—Stephen W Jackson
*Assistant Examiner*—Tien Mai
(74) *Attorney, Agent, or Firm*—Patent Law Group LLP

(57) ABSTRACT

An overcurrent protection circuit for a current setting circuit is disclosed herein that prevents a user-selectable current from exceeding a current limit when an incorrect current selecting component (or current selecting circuit) is connected to an external control pin of a package by the user, or when the control pin is inadvertently grounded. The protection circuit senses a current (A1*Iset) mirrored from the user-set current (Iset). If the mirrored current is above a threshold, the protection circuit limits the Iset current to be at or below a current limit level. In one embodiment, the protection circuit comprises a transistor that turns on when the mirrored current exceeds a threshold, and the transistor shunts control current from a series transistor generating the user-set current Iset.

24 Claims, 5 Drawing Sheets

OVERCURRENT PROTECTION CIRCUIT WHEN SETTING CURRENT USING A PACKAGE CONTROL PIN

FIELD OF THE INVENTION

This invention relates to overcurrent protection circuits and, in particular, to an overcurrent protection circuit when the current is set by a user with an external component.

BACKGROUND

FIG. 1 illustrates a conventional six-pin package 10 containing an integrated circuit chip. There may be any number of pins extending from the package. It is common in certain types of circuits to allow the user to set an internal current by connecting a component, such as a resistor, to a specified pin of the package. FIG. 1 illustrates a current set resistor Rset connected to a control pin 12 of the package.

FIG. 2 illustrates one type of current setting circuit 14 internal to the chip, where the external resistor Rset sets a current internal to the chip. The user-selected current may be for setting timing, setting a frequency, setting a threshold, setting an output current, setting a bias, or any other use. The low voltage reference internal to the chip is identified as Vee, which may be ground.

In FIG. 2, lowering the value of Rset increases the internal current set (Iset) level. A proportional current, labeled A*Iset, is then used by the chip for any purpose.

A differential amplifier consists of transistors Q0-Q3. Transistors Q1 and Q0 are connected as a current mirror so that the currents through Q1 and Q0 are approximately equal. A fixed reference voltage Vref sets a current through Q1 and Q2. The sum of the currents through Q2 and Q3 equals the current drawn by the constant current source 16.

Feedback is used so that the current (Iset) through the resistor Rset causes the voltage drop across Rset to always be slightly lower than Vref to maintain equilibrium in the circuit. A lower value of Rset requires a greater Iset to create the required voltage drop for equilibrium.

As an example of the circuit's operation, if the voltage at pin 12 were initially much less than Vref, then less current flows through Q3, and the extra current generated by Q0 flows into the base of Q4 to increase the Iset current through Q4 and the resistor Rset. This increases the voltage drop across Rset until there is equilibrium, whereby Q3 is controlled by the voltage drop to allow only that excess current into the base of Q4 necessary to maintain the circuit at equilibrium. Since only a small variation in the Q3 base current causes a large variation in Iset current, the voltage drop across Rset is only slightly less than Vref.

A current mirror formed by Q5 and Q6 causes a proportional current (A*Iset) to flow through Q6. The proportion is typically determined by the relative emitter sizes of the transistors. The current through Q6 is typically many times that of the current through Q5. Other currents may also be generated by other current mirror bank transistors Qn.

During the use of the circuit of FIGS. 1 and 2, pin 12 may be unintentionally shorted to ground or the user may mistakenly connect a resistor to pin 12 that has too low a value. If pin 12 is shorted to ground, this will cause all current generated by Q0 to flow into the base of Q4 to create very high Iset and A*Iset currents. Such high currents may damage the transistors and other components on the chip. Further, if the A*Iset current is used to control circuits external to the package 10 of FIG. 1, such overcurrents may also damage such external circuits.

SUMMARY

An overcurrent protection circuit is disclosed herein that may be connected to many different types of current setting circuits. The protection circuit senses a current (A1*Iset) mirrored from the Iset current. If the mirrored current (A1*Iset) is above a threshold, the protection circuit limits the Iset current to be at or below a current limit level (Ilim).

In one embodiment, the protection circuit is applied to the circuit of FIG. 2. The Iset current that flows through the resistor Rset is mirrored (A1*Iset) in a current limiting circuit. The Iset current is also mirrored to generate one or more other currents (A2*Iset to An*Iset) that are used by other circuits internal or external to the integrated circuit. The A1*Iset current flows through a sense resistor internal to the chip. If the voltage drop across the sense resistor exceeds a threshold, the voltage drop turns on a shunt transistor that limits the base current into the Iset series transistor to thus limit the Iset current to a certain current level. If the Iset current is low enough to not trigger the current limiting circuitry, the current limiting circuitry has no effect on the user-selectable current level.

In another embodiment, the current limiting circuitry not only limits the current to a maximum allowable current when Rset is too low but further limits the current as a proportion of the Rset value when the Rset value is below a threshold value. In this way, the Iset, A1*Iset, and other currents are not maintained at a high limit value when a problem (e.g., a short) is detected by the protection circuit.

The invention is not limited to setting the current with a resistor. Setting the current with a current source (controlled by any means), a component, a digital circuit, or other means is also envisioned. Further, the current can be set by the user by other than a control pin of a package. In one example, the circuit containing the invention may be implemented on a circuit board using discrete components, wherein a terminal is provided for setting a current.

The protection circuit may be implemented using bipolar transistors or MOSFETs to protect many types of current setting circuits where an external pin or other terminal is used to set a current.

BRIEF DESCRIPTION OF THE DRAWINGS

Elements labeled with the same numeral in the various figures may be the same or equivalent.

DETAILED DESCRIPTION

Figure 1:
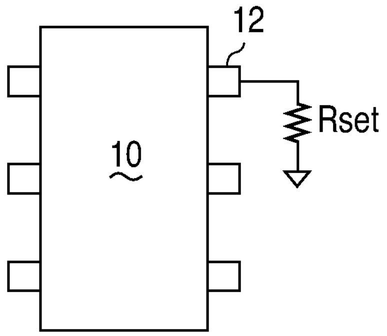
FIG. 1 (PRIOR ART)
FIG. 1 illustrates a conventional package housing an integrated circuit where a control pin allows a user to set a current using a resistor.
Figure 2:
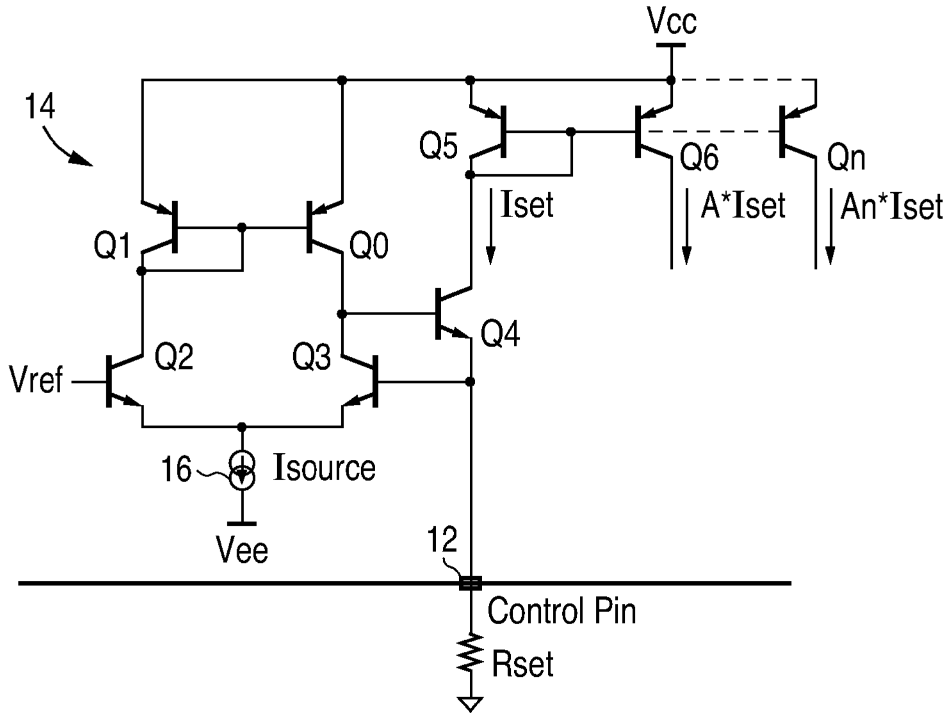
FIG. 2 (PRIOR ART)
FIG. 2 is a schematic diagram of a prior art circuit for setting a current internal to the IC of FIG. 1.
Figure 3:
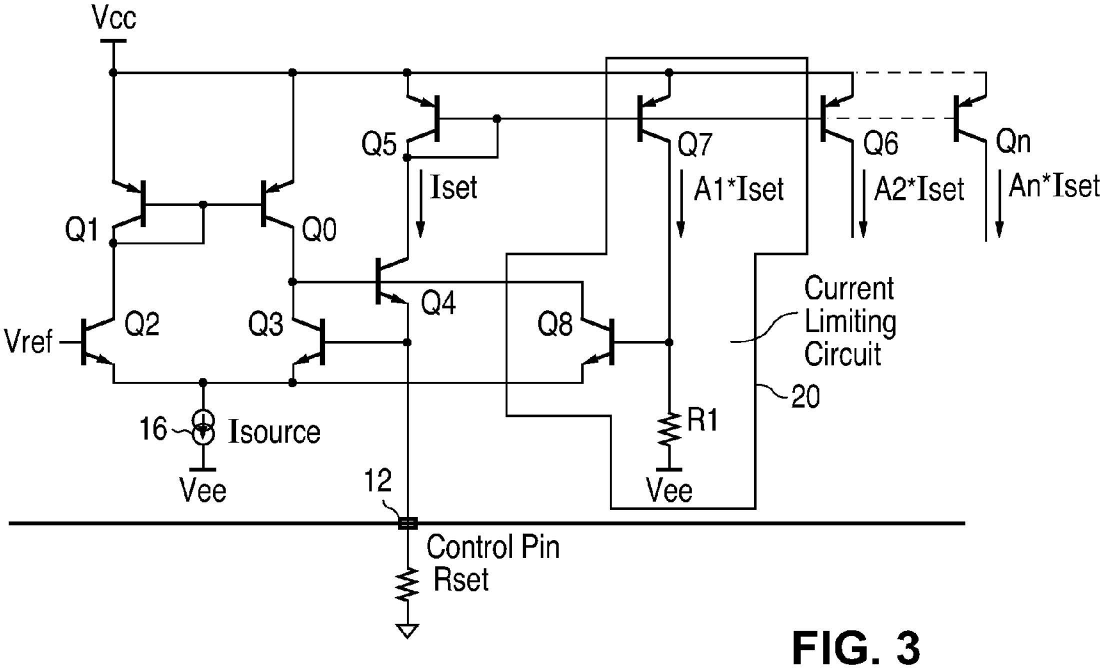
FIG. 3 is a schematic diagram of a current setting circuit, including a current limiting circuit in accordance with the present invention for preventing a current from exceeding a maximum current threshold.

The circuit of FIG. 3 uses the same circuitry as FIG. 2 but adds a current limiting circuit 20 that prevents the current from exceeding a threshold. The circuit is internal to the package of FIG. 1.

In all embodiments, the external ground should not be lower than Vee. The Vee terminal may be brought out as an external terminal for connection to ground.

In FIG. 3, the mirrored current generated by transistor Q6 is labeled A2*Iset, but is the same current A*Iset generated by Q6 in FIG. 2. Since the difference between FIGS. 2 and 3 is only in the current limiting circuit 20, only the current limiting circuit 20 will be described in detail.

Transistors Q5, Q6, and Q7 are connected as a current mirror bank, and their respective currents are proportional to their relative emitter sizes. Generally, Q5 and Q7 will be much smaller than Q6 so that a minimum amount of current is used by the current setting circuitry. The current through Q7 is labeled as A1*Iset and flows through a fixed resistor R1 internal to the chip so that the user cannot change the value of R1. R1 is connected to the base of Q8. The value of R1 and the size of Q7 are selected so that when Iset exceeds a predetermined threshold level, the voltage drop across R1 will equal Vref, which will turn on transistor Q8. Q8 turns on because the emitter of Q8 is at Vref−Vbe and its base is at Vref, where Vbe equals the turn on voltage of Q8 (e.g., 0.7 volts).

When Q8 conducts, it means that Q4 is conducting too much current, since the current through Q4 determines the current through R1. Q8 shunts the base current from Q4, preventing Q4 from conducting current beyond the threshold level. Accordingly, once Q8 has been turned on by an overcurrent level, the circuit is kept at the threshold current level by such feedback. If the overcurrent condition is removed, such as by a short of pin 12 being removed, Q8 turns off, and the current limiting circuit 20 becomes transparent and has no effect on Iset.

Figure 5:
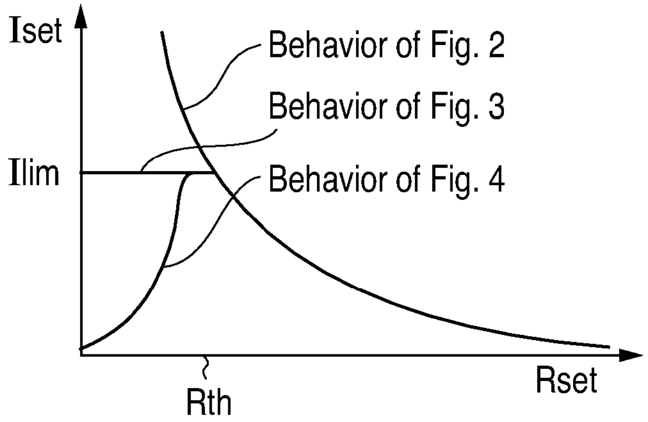
FIG. 5 is a graph comparing the operations of the circuits of FIGS. 2, 3, and 4.

FIG. 5 illustrates the behavior of the circuits of FIGS. 2 and 3. When the value of Rset is above the threshold value Rth, the Iset current is below the overcurrent threshold. The prior art FIG. 2 increases the Iset current beyond a dangerous limit as the Rset value is reduced below the Rth value, eventually damaging components subjected to the high currents. The circuit of FIG. 3 limits the Iset current to a maximum current Ilim (Ilim=Vref/R1) once the value of Rset is below the Rth value, thus preventing damage to circuit components. This also enables the manufacturer of the product incorporating the circuit of FIG. 3 to specify a maximum generated current, even upon the user inadvertently using an incorrect resistor Rset or a short occurring, easing up safety and design considerations for other circuits connected to the product.

One drawback of the circuit of FIG. 3 is that the overcurrent condition set by the low Rset value may not be detected by the user, since the maximum current limit may still result in acceptable operation of all affected circuits. Therefore, the current setting circuitry will be generating more current than the user actually intended. This wastes energy and results in non-optimum operation.

The circuit of FIG. 4 limits the Iset current to a lower and lower amount as the Rset value goes below the Rth value, as shown in FIG. 5. Therefore, the circuit of FIG. 4 does not have the drawback of generating a maximum current limit, in contrast to the circuit of FIG. 3.

Figure 4:
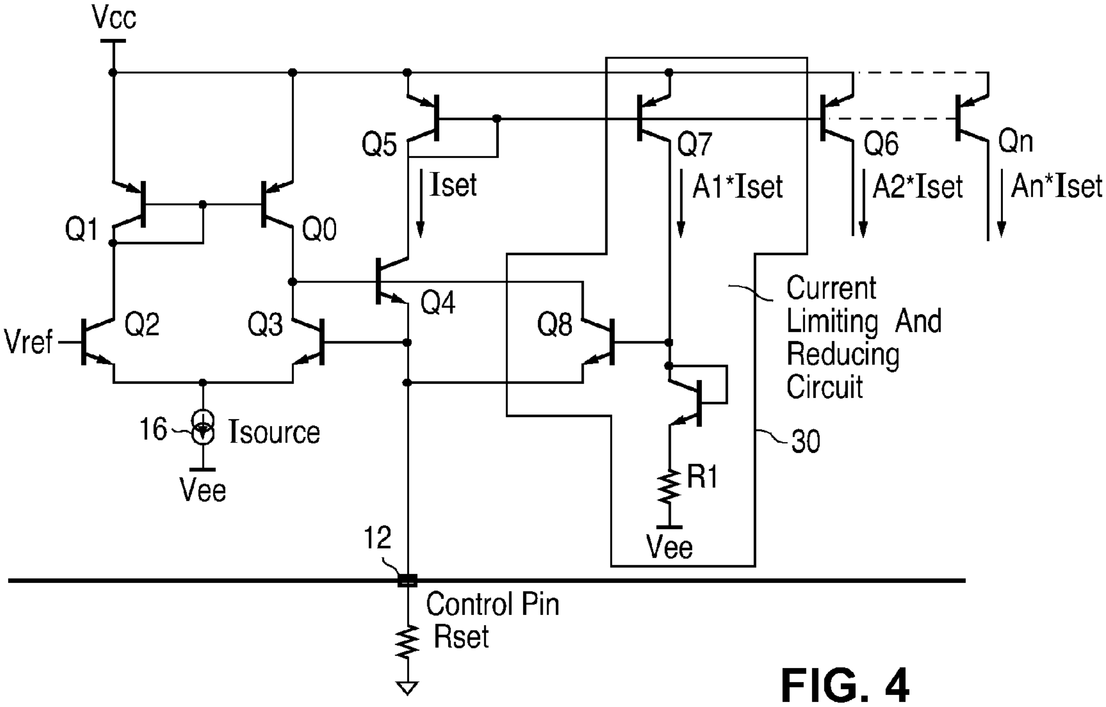
FIG. 4 is a schematic diagram of a current setting circuit, including a current limiting and reducing circuit in accordance with the present invention for limiting a current to a level well below a maximum allowable level when it determined that the current set resistor value is too low.

In FIG. 4, when the Rset value is the low threshold value Rth, the current limiting and reducing circuit 30 turns on Q8 once the voltage across the resistor R1 reaches the value of Vref (the same voltage applied to the base of Q2). Q9 is connected as a diode to create a Vbe drop (e.g., 0.7 volts) for proper operation of the circuit. When A1*Iset generates the voltage Vref across R1, the voltage at the base of Q8 is approximately Vref+Vbe, and the voltage at the emitter of Q8 is approximately Vref, so Q8 is turned on. Since Q8 is conducting current, it draws base current away from Q4 to prevent Q4 from increasing the Iset current, since Q8 is connected across the base and emitter of Q4. The Q8 current flows through Rset. Therefore, in this operational example, Q8 limits the Iset current to Ilim (see FIG. 5) when the R1 voltage equals approximately Vref and Rset equals Rth.

The circuit of FIG. 4, however, also limits the Iset current to values below the maximum Ilim current (FIG. 5) when the Rset value is below Rth. With a Rset value less than Rth, less voltage will be dropped across Rset when conducting a certain current level, which lowers the emitter voltage of Q8. Therefore, when the Rset value is less than Rth, prior to the voltage at the control pin 12 reaching Vref, the voltage across R1 will be sufficient to turn on Q8 even when the voltage at R1 is somewhat less then Vref, since the base-emitter voltage of Q8 is still Vbe. In other words, the required voltage at R1 to turn on Q8 goes down (requires lower A1*Iset) as the Rset value is reduced below Rth since the voltage drop across Rset (the Q8 emitter voltage) becomes less and less as Rset is decreased.

The current through Q8 is limited by the current source 16, and the Q8 collector current is substantially constant once Rset is less than Rth, since Q8 remains on.

Figure 6:
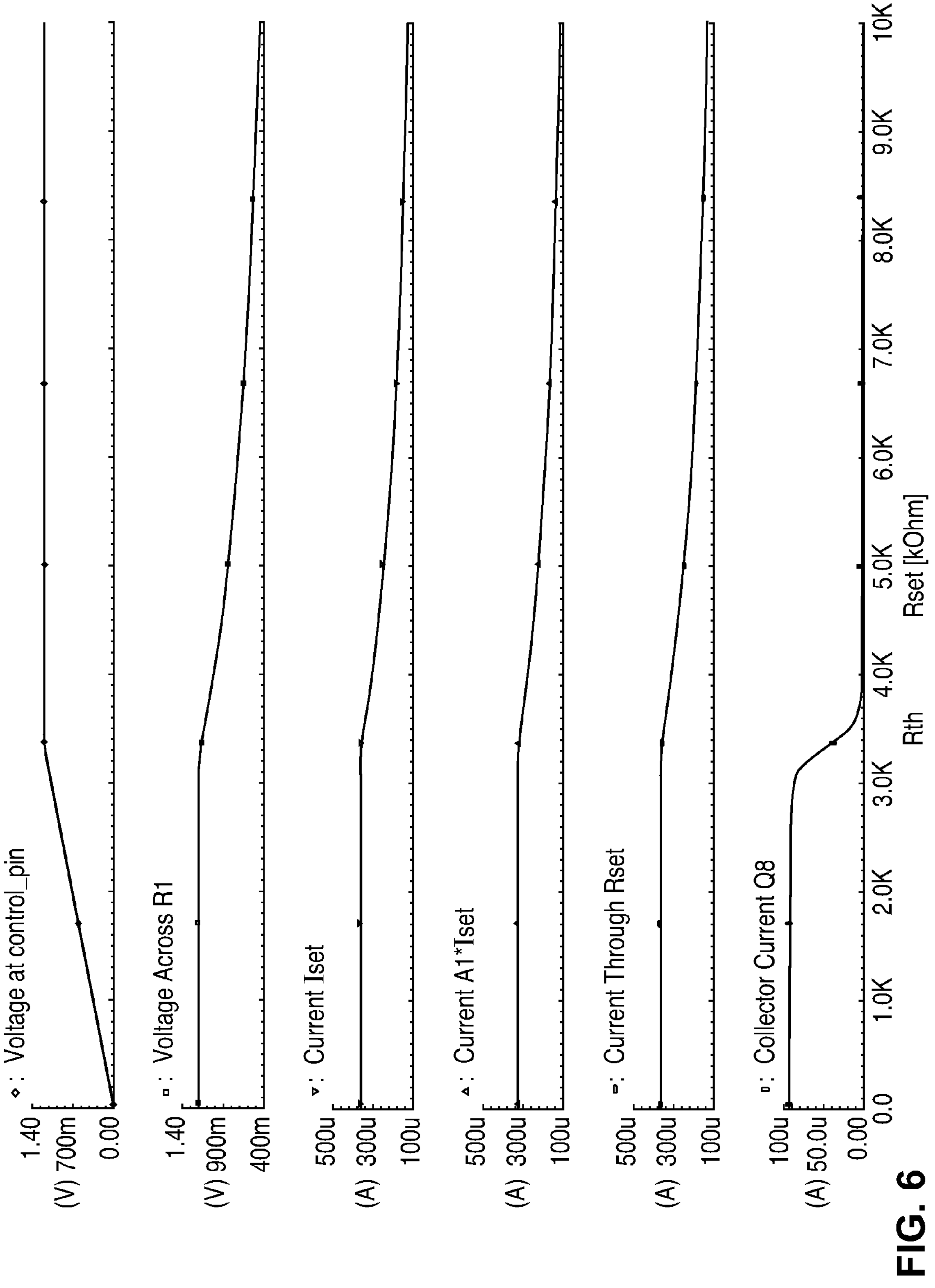
FIG. 6 is a set of graphs identifying relevant voltages and currents vs. Rset in the circuit of FIG. 3.
Figure 7:
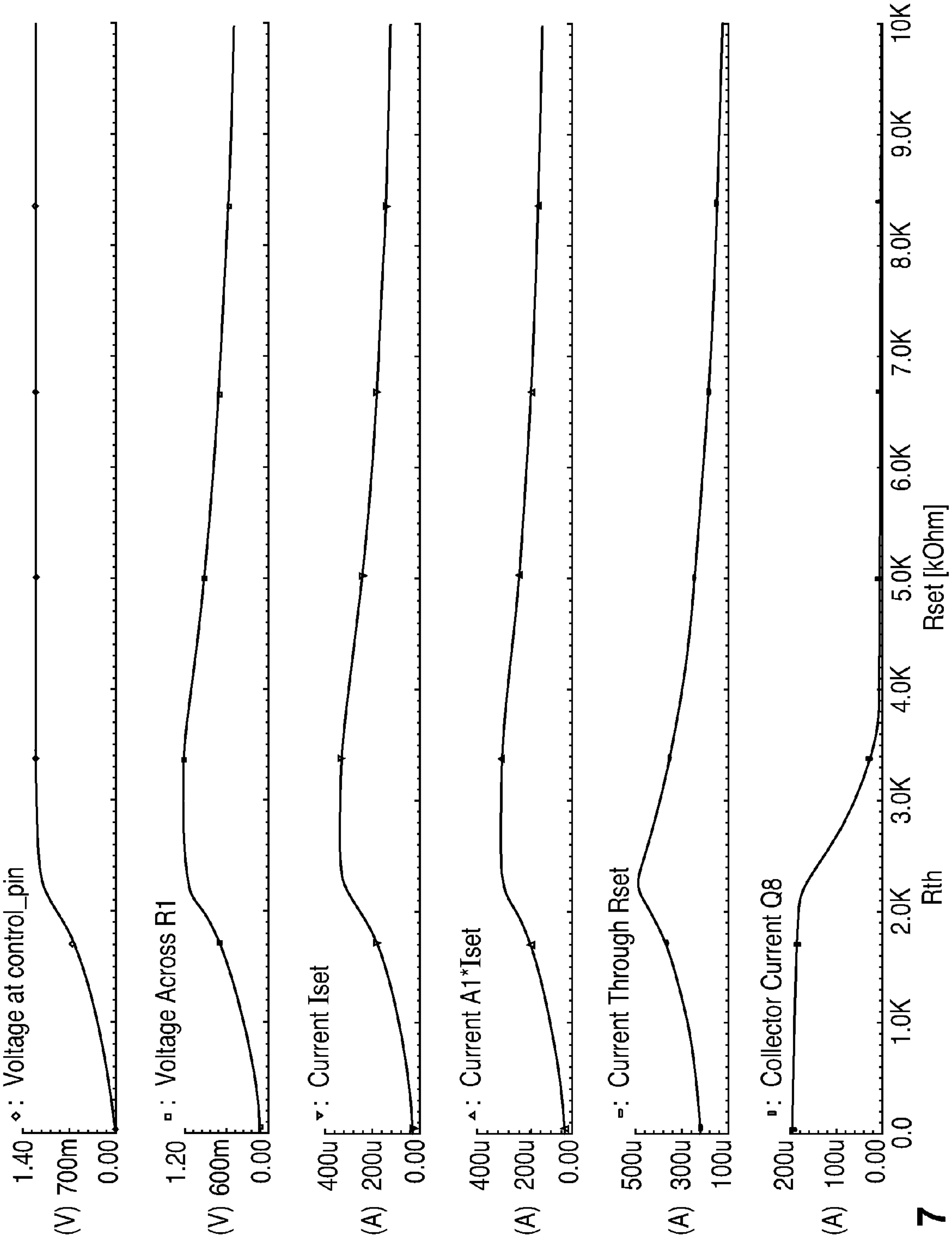
FIG. 7 is a set of graphs identifying relevant voltages and currents vs. Rset in the circuit of FIG. 4.

FIG. 6 is a set of self-explanatory graphs identifying examples of relevant voltages and currents vs. Rset in the circuit of FIG. 3, and FIG. 7 identifies the same set of voltages and currents in the circuit of FIG. 4. Voltages are in millivolts and currents are in microamps. The values in the graphs are from a computer simulation of one embodiment of the circuit. The values in an actual circuit would depend on the specific circuit design.

The protection circuit can be implemented in MOSFET technology as well.

Figure 8:
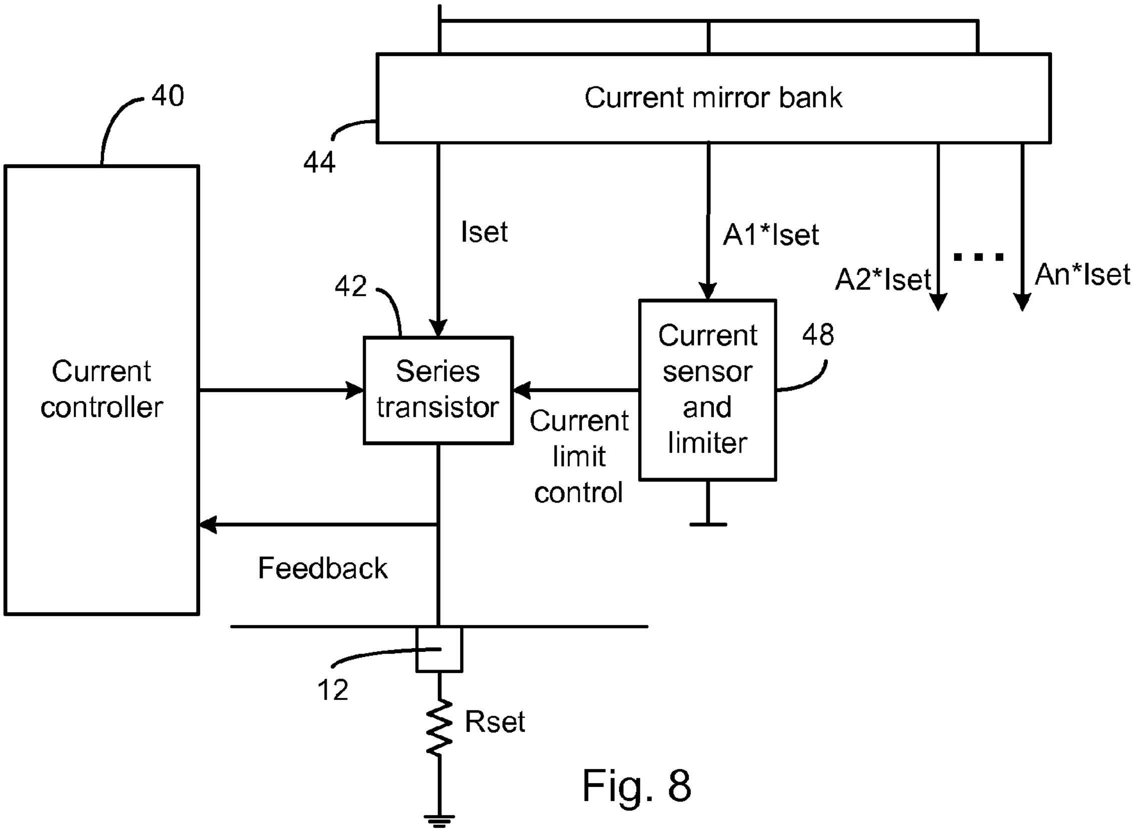
FIG. 8 is a simplified circuit diagram illustrating the basic components of an embodiment of the current setting/protection circuit.

FIG. 8 is a high level diagram illustrating the basic invention. The circuit may or may not be housed in a package. A current controller 40, which may be the differential amplifiers in FIGS. 3 and 4 or another circuit, receives a feedback voltage, which will typically be the voltage at control pin 12. The controller 40 controls the Iset current through a series transistor 42 to maintain the feedback voltage at a certain level. Current mirror bank 44 generates currents A1*Iset through An*Iset proportional to Iset. The current A1*Iset is sensed by a current sensor and limiter 48, which has a threshold. Upon the current threshold being reached, the current sensor and limiter 48 controls the transistor 42 and/or the controller 40 to limit the Iset current so that the A1*Iset current remains below the threshold. The A2*Iset-An*Iset currents are applied to other circuitry.

In all the embodiments, A1*Iset may be greater than, less than, or equal to Iset.

In the preferred embodiment, all the components except for Rset are integrated on the same semiconductor chip. The pin 12 may be any external terminal of an IC package.

Figure 9:
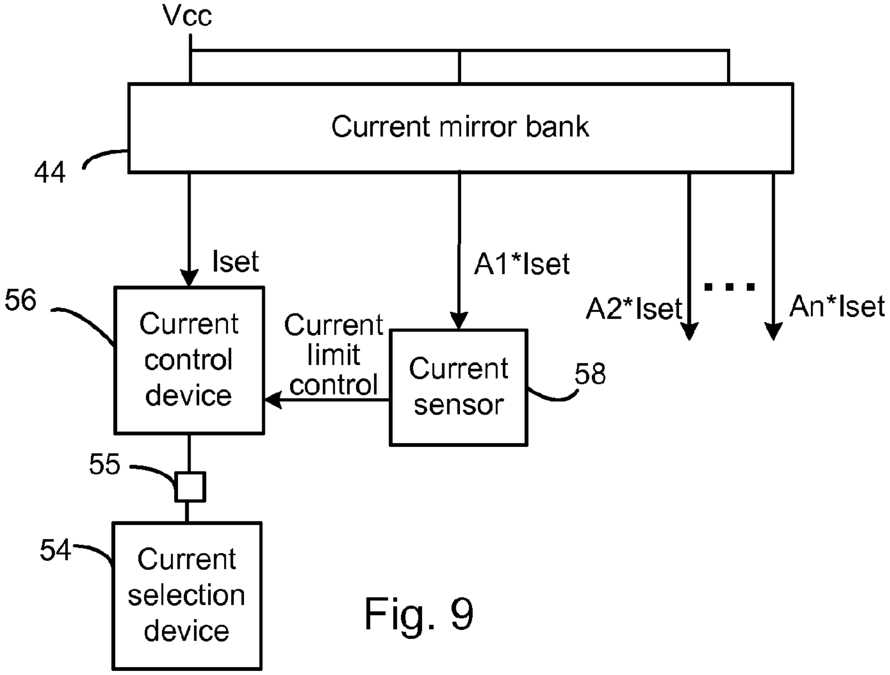
FIG. 9 is a simplified circuit diagram illustrating the basic components of an embodiment of the current setting/protection circuit where any type of current setting device is used to set the current.

The invention is not limited to setting the current with a resistor. Setting the current with a current source (controlled by any means), a component, a digital circuit, or other means is also envisioned, as illustrated in FIG. 9, described below. For example, the current setting circuit may limit or reduce its generated current once an external current source (used for selecting the current) has exceeded a threshold current. Further, the current can be set by the user by other than a control pin of a package. In one example, the circuit containing the invention may be implemented on a circuit board using discrete components, wherein a terminal is provided for setting a current.

FIG. 9 is a simplified circuit diagram illustrating the basic components of an embodiment of the current setting/protection circuit where any type of current selecting device 54, connected to a terminal 55, is used to set the current. The current selection device 54 sets the current conducted by a current control device 56. Proportional currents are generated using the current mirror bank 44. A current sensor 58 determines whether one of the mirrored currents exceeds a threshold and, if so, controls the current control device 56 to limit the currents generated by the current mirror bank 44. The terminal 55 may be a control pin of an IC package or another terminal.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A system comprising a packaged integrated circuit, the integrated circuit incorporating a current setting circuit, the package having an external first terminal for connecting a current selection device thereto for setting a current generated by the current setting circuit, the current setting circuit comprising:

- a first transistor for conducting a first current in response to a control signal;
- a first controller having an input terminal for receiving a signal related to the first current (Iset) through the first transistor and having a control signal output terminal coupled to control the first transistor, the first controller setting the first current through the first transistor based on a characteristic of the current selection device externally connected to the first terminal of the package;
- a first current mirror generating a second current (A1*Iset) related to the first current, wherein the first current mirror comprises a first current mirror transistor in series with the first transistor, where the first current (Iset) through the first current mirror transistor determines the second current (A1*Iset);
- a current sensor for sensing the second current; and
- a current limiting transistor connected to the current sensor, the current limiting transistor conducting current when the current sensor senses the second current exceeding a threshold due to the characteristic of the current selection device externally connected to the first terminal of the package, the current limiting transistor being connected to the first transistor to limit the first current through the first transistor when the current sensor senses that the second current has exceeded the threshold.

2. The system of claim 1 wherein a current handling terminal of the first transistor is coupled to the first terminal.

3. The system of claim 1 wherein a current handling terminal of the current limiting transistor is coupled to a control terminal of the first transistor.

4. The system of claim 1 wherein a current handling terminal of the current limiting transistor is coupled between a control terminal of the first transistor and a current handling terminal of the first transistor.

5. The system of claim 4 wherein the current handling terminal of the current limiting transistor is also coupled to the first terminal.

6. The system of claim 1 wherein the current selection device is a component having a value, wherein the current limiting transistor is connected so as to limit the first current when the value of the component connected to the first terminal is within a certain value range and to not limit the first current when the value of the component is outside of the certain value range.

7. The system of claim 1 wherein the current selection device is a component having a value, wherein the current limiting transistor is connected so as to limit the first current when the value of the component connected to the first terminal is within a certain value range and to not limit the first current when the value of the component is outside of the certain value range, wherein the current limiting transistor progressively limits the first current to lower and lower levels as the value of the component progressively deviates from a particular value within the certain value range.

8. The system of claim 1 wherein the current selection device is a component having a value, wherein the component connected to the first terminal provides a resistance.

9. The system of claim 1 wherein the current limiting transistor limits the first current when the characteristic of the current selection device is within a certain characteristic range and does not limit the first current when the characteristic of the current setting device is outside of the certain characteristic range.

10. The system of claim 1 wherein the current limiting transistor progressively limits the first current to lower and lower levels as the characteristic of the current selection device progressively deviates from a certain characteristic in a certain manner.

11. The system of claim 1 wherein the first controller is a differential amplifier with a fixed reference voltage coupled to one input of the differential amplifier and the first terminal coupled to another input of the differential amplifier.

12. The system of claim 1 wherein the current sensor is a resistor connected to the first current mirror, and wherein the current limiting transistor has a control terminal connected to receive a voltage based on a voltage drop across the resistor, wherein conduction of the current limiting transistor reduces conduction of the first transistor.

13. The system of claim 12 wherein the first transistor and current limiting transistor are bipolar transistors, and wherein a collector of the current limiting transistor is connected to a base of the first transistor, and an emitter of the current limiting transistor is connected to a constant current source in the first controller.

14. The system of claim 12 wherein the first transistor and current limiting transistor are bipolar transistors, wherein a collector and emitter of the current limiting transistor are connected to a base and emitter, respectively, of the first transistor, and wherein the emitter of the current limiting transistor is connected to the first terminal.

15. The system of claim 1 wherein the first current mirror is part of a current mirror bank comprising a bank input for the first current (Iset), a first bank output for the second current (A1*Iset), and at least a third bank output for providing at least a third current (A2*Iset) related to the first current, the third current being used by additional circuitry internal to the integrated circuit.

16. The system of claim 1 wherein the second current has a magnitude different from a magnitude of the first current.

17. A method performed by a current setting circuit, the current setting circuit having a first terminal for connecting a current selection device thereto for setting a current generated by the current setting circuit, the method comprising:

conducting a first current (Iset) by a first transistor in response to a control signal generated by a first controller;

receiving a signal by the first controller related to the first current through the first transistor, the first controller setting the first current based on a characteristic of the current selection device connected to the first terminal;

generating a second current (A1*Iset) by a first current mirror related to the first current, wherein the first current mirror comprises a first current mirror transistor in series with the first transistor, where the first current (Iset) through the first current mirror transistor determines the second current (A1*Iset);

sensing the second current; and limiting the first current through the first transistor only when it is sensed that the second current has exceeded a threshold due to the characteristic of the current selection device connected to the first terminal.

18. The method of claim 17 wherein the current selection device is a component having a value, wherein the component connected to the first terminal provides a resistance.

19. The method of claim 17 wherein sensing the second current comprises creating a voltage drop across a resistor conducting the second current, and wherein limiting the first current comprises turning on a current limiting transistor when the voltage drop across the resistor has exceeded a threshold voltage and shunting the control signal away from the first transistor to prevent the first transistor from conducting additional current.

20. The method of claim 19 wherein the current limiting transistor progressively limits the first current to lower and lower levels as the characteristic of the current selection device progressively deviates from a certain characteristic in a certain manner.

21. The method of claim 17 further comprising generating at least a third current (A2*Iset) related to the first current, the third current being used by additional circuitry.

22. The method of claim 17 wherein the second current has a magnitude different from a magnitude of the first current.

23. The method of claim 17 wherein limiting the first current comprises limiting the first current when the characteristic of the current selection device connected to the first terminal is within a certain characteristic range and not limiting the first current when the characteristic of the current setting device is outside of the certain characteristic range.

24. The method of claim 17 wherein the first terminal is a control pin of a packaged integrated circuit incorporating the current setting circuit.

* * * * *